(12) United States Patent
Cha et al.

(10) Patent No.: US 10,173,601 B2
(45) Date of Patent: Jan. 8, 2019

(54) CARRIER APPARATUS FOR VEHICLE

(71) Applicant: Hyundai Motor Company, Seoul (KR)

(72) Inventors: Dong Eun Cha, Seongnam-si (KR);
Hyun Gyung Kim, Hwaseong-si (KR);
Keon Soo Jin, Ulsan (KR); Jin Young Yoon, Gimpo-si (KR); Ki Hong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 84 days.

(21) Appl. No.: 15/346,683

(22) Filed: Nov. 8, 2016

(65) Prior Publication Data
US 2018/0009390 A1   Jan. 11, 2018

(30) Foreign Application Priority Data

Jul. 6, 2016 (KR) .................. 10-2016-0085277

(51) Int. Cl.
*B60R 9/06* (2006.01)
*B60R 9/10* (2006.01)

(52) U.S. Cl.
CPC ............... *B60R 9/06* (2013.01); *B60R 9/10* (2013.01); *Y10S 224/924* (2013.01)

(58) Field of Classification Search
CPC .......... B60R 9/06; B60R 9/10; Y10S 224/924
USPC ....................................................... 224/489
See application file for complete search history.

(56) References Cited

U.S. PATENT DOCUMENTS

| 1,886,911 | A | * | 11/1932 | Schulman | B60R 9/06 224/491 |
| 2,052,483 | A | * | 8/1936 | Monteith | B60R 19/023 224/491 |
| 4,676,415 | A | * | 6/1987 | Kennedy | B62D 43/04 224/42.21 |
| 6,379,101 | B1 | * | 4/2002 | Breaux | B60P 1/43 224/521 |
| 6,783,315 | B1 | * | 8/2004 | Senechal | B60P 1/43 224/502 |
| 7,121,597 | B2 | * | 10/2006 | Chuang | B60R 9/06 293/117 |
| 7,574,764 | B1 | * | 8/2009 | Irving | B60P 3/1033 14/69.5 |
| 7,785,058 | B2 | * | 8/2010 | Ray | B60R 9/065 224/527 |
| 7,806,307 | B2 | * | 10/2010 | Bergerhoff | B60R 9/048 224/282 |
| 7,909,213 | B2 | * | 3/2011 | Bergerhoff | B60R 9/10 224/197 |

(Continued)

FOREIGN PATENT DOCUMENTS

JP    H08-318790 A   12/1996
KR  20-1998-0016374 U   6/1998
(Continued)

*Primary Examiner* — Peter Helvey
(74) *Attorney, Agent, or Firm* — Morgan, Lewis & Bockius LLP

(57) ABSTRACT

A carrier apparatus for a vehicle may include a bumper back beam to be drawn out and received in the bumper back beam, an adapter cover rotatably disposed at an upper portion of the carrier in an up and down direction and having an upper portion depressed to form an installation space, and a loading cover detachably connected to the installation space of the adapter cover and provided with a fixture for fixing a luggage loaded at an upper portion thereof.

15 Claims, 8 Drawing Sheets

(56) References Cited

U.S. PATENT DOCUMENTS

| | | | |
|---|---|---|---|
| 8,418,902 B2* | 4/2013 | Cha | B60R 9/10 224/488 |
| 9,174,584 B1* | 11/2015 | Cha | B60R 9/10 |
| 9,376,062 B2* | 6/2016 | Cha | B60R 9/06 |
| 9,428,117 B2* | 8/2016 | Lee | B60R 9/10 |
| 9,533,624 B2* | 1/2017 | Cha | B60R 9/06 |
| 2007/0090142 A1* | 4/2007 | Chuang | B60P 3/07 224/496 |
| 2007/0102465 A1* | 5/2007 | Wezyk | B60R 9/06 224/321 |
| 2007/0205617 A1* | 9/2007 | Hahn | B60P 1/6481 293/119 |
| 2008/0006184 A1* | 1/2008 | Simon | B60R 9/06 108/44 |
| 2008/0006663 A1* | 1/2008 | Bergerhoff | B60R 9/10 224/400 |
| 2008/0006664 A1* | 1/2008 | Bergerhoff | B60R 9/06 224/495 |
| 2008/0006665 A1* | 1/2008 | Bergerhoff | B60R 9/06 224/497 |
| 2008/0006667 A1* | 1/2008 | Bergerhoff | B60R 9/048 224/533 |
| 2008/0007040 A1* | 1/2008 | Maucher | B60R 9/10 280/769 |
| 2010/0001029 A1* | 1/2010 | Tai | B60R 5/041 224/499 |
| 2013/0182454 A1* | 7/2013 | Hofmann | B60R 9/10 362/549 |
| 2016/0096483 A1* | 4/2016 | Cha | B60R 9/06 224/496 |
| 2016/0152190 A1* | 6/2016 | Lee | B60R 9/10 224/489 |
| 2016/0288729 A1* | 10/2016 | Cha | B60R 9/10 |

FOREIGN PATENT DOCUMENTS

| | | |
|---|---|---|
| KR | 10-0773082 B1 | 11/2007 |
| KR | 10-2011-0034733 A | 4/2011 |
| KR | 10-2011-0035378 A | 4/2011 |
| KR | 10-1611081 B1 | 4/2016 |

* cited by examiner

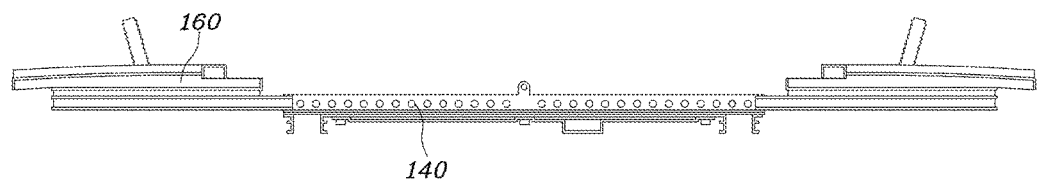
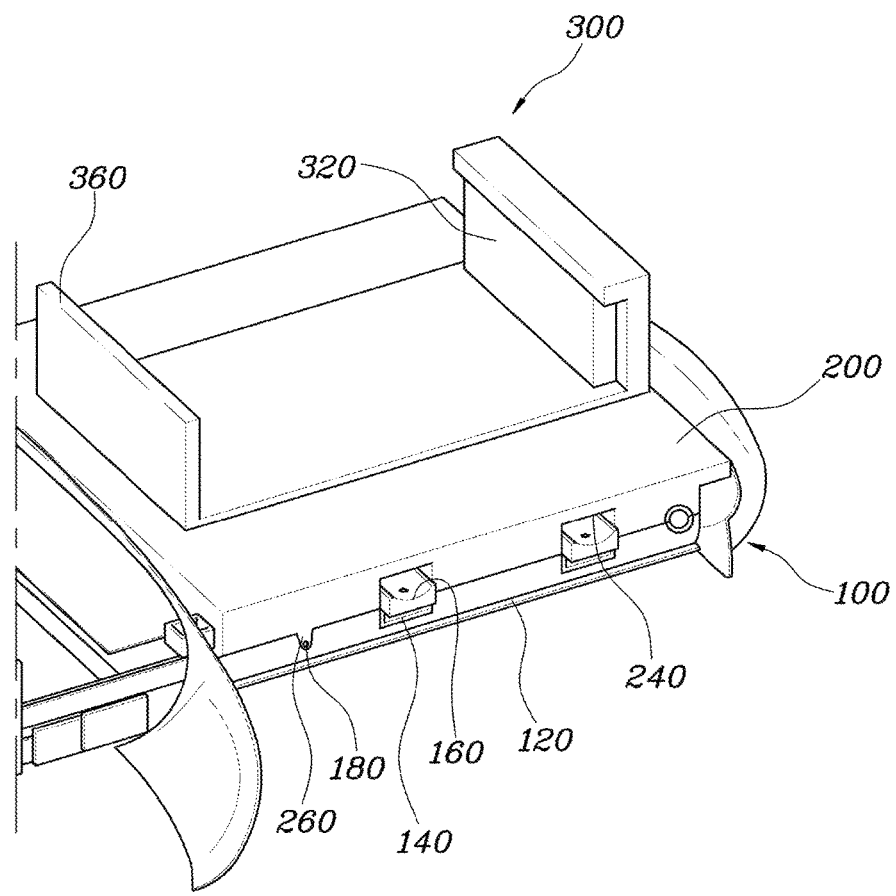

CARRIER APPARATUS FOR VEHICLE

CROSS REFERENCE TO RELATED APPLICATION

The present application claims priority to Korean Patent Application No. 10-2016-0085277, filed Jul. 6, 2016, the entire contents of which is incorporated herein for all purposes by this reference.

BACKGROUND OF THE INVENTION

Field of the Invention

The present invention relates to a carrier apparatus for a vehicle installed at a rear bumper side to load a bicycle and luggage.

Description of Related Art

Recently, as a bicycle is used as leisure means, the bicycle is loaded in a vehicle to transport the bicycle to a bicycle trail or to near the mountains.

However, the bicycle generally has a large volume and therefore even though a trunk or a back seat room of the vehicle is used, it is difficult to load the bicycle.

To solve the above problem, various methods for loading a bicycle outside the vehicle have been proposed, but in the case of a method of fixing and loading a bicycle in a roof panel of the vehicle, a loading work itself is very inconvenient and a height of the vehicle is increased, such that the bicycle is locked when entering a tunnel or a building, thereby causing safety accidents.

A method of loading a bicycle at a back portion of a tail gate of the vehicle may cause an inconvenience to install a separate carrier apparatus in the tail gate and ruin an appearance design due to the exposure of the carrier apparatus to the outside even at ordinary times when the bicycle is not loaded.

Further, since when the bicycle needs to be loaded, the carrier apparatus is installed manually and when the bicycle need not be loaded, an inconvenience to again separate the bicycle occurs. As a result, convenience is insufficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a carrier apparatus for a vehicle in which a bicycle carrier is installed at a bumper back beam of a back portion of the vehicle to prevent the bicycle carrier from being exposed to the outside at ordinary times and draw out the bicycle carrier from the bumper back beam at the time of a loading of the bicycle to thereby enable a loading of the bicycle and a luggage, thereby maintaining an appearance design and improving convenience at ordinary times.

Additionally, various aspects of the present invention are directed to providing a carrier apparatus for a vehicle capable of firmly and stably fixing the luggage at the time of a loading of various sizes of the luggage as well as a bicycle and conveniently fixing the loaded luggage, thereby further improving use convenience.

According to various aspects of the present invention, a carrier apparatus for a vehicle may include a carrier slidably disposed in a front and back direction at a lower portion of a bumper back beam to be drawn out and received in the bumper back beam, an adapter cover rotatably disposed at an upper portion of the carrier in an up and down direction and having an upper portion depressed to form an installation space, and a loading cover detachably connected to the installation space of the adapter cover and provided with a fixture for fixing a luggage loaded at an upper portion thereof.

The bumper back beam may be provided with guide rails extended in the front and back direction, and side ends of the carrier may be provided with slide rails connected to the guide rails and slided on the guide rails.

The carrier may be provided with an extension rail extending to cross the sliding rail and an extension support slidably moving in both side directions along the extension rail.

The adapter cover may be formed in a flat plate having a predetermined area to cover the upper portion of the carrier and may be provided with a sliding hole in both of the side directions to expose the extension support of the carrier through the sliding hole.

Both side ends of a back end of the carrier may be provided with locking pins, and a back end of the adapter cover may be provided with a fastening part that is fastened to and unfastened from the locking pin and a front end thereof is rotatably hinge-connected to the carrier.

The fastening part may be extended downward from both side ends of the adapter cover and may be provided with a through hole into which the locking pin is inserted and the through hole may be provided with a fixed protrusion.

A first side of the installation space of the adapter cover may be provided with a first fixing part and a second side thereof may be provided with a second fixing part, and the loading cover may be provided with a first connection part with which the first fixing part is fastened and a second connection part with which the second fixing part is fastened, when the loading cover is connected to the installation space.

The first fixing part may be formed of a piston that protrudes while being elastically supported at the first side of the installation space and the first connection part may be formed of an insertion groove depressed to have the piston inserted thereinto.

The second fixing part may be formed of a magnetic body disposed at the second of the installation space, and the second connection part may be disposed at a side of the loading cover to correspond to the magnetic body and formed of a corresponding body connected reacting to the magnetic body.

A front end of the loading cover may be provided with the fixture and a back end thereof may be provided with a fixed end upwardly extended, and thus the fixture pushes the luggage toward the fixed end when the luggage is loaded between the fixture and the fixed end, to thereby fix the luggage.

The fixture may include a case opened toward a back portion, a moving member provided to move in a front and back direction in the case, and a fixing member disposed at a front end of the case to elastically support the moving member and moving in the front and back direction in the case and then fixed.

The case may be formed in a box shape having an opened back portion and provided with locking protrusions protruding inwardly at upper and lower ends thereof, and protrusions may protrude at upper and lower ends of the moving member to be locked to the locking protrusions when the moving member moves in the case to limit the movement of the moving member.

The upper and lower ends of the case may each be provided with position fixing parts that are elastically supported inwardly to inwardly protrude and have the protrusions of the moving member locked thereto, and the position fixing parts are provided in plural while being spaced apart from each other at a predetermined distance.

A front end of the moving member may be provided with a connection part that is extended forwardly and formed with an insertion hole, and a back end of the fixing member may be provided with a contact part contacting the connection part and the contact part may be provided with a rod inserted into the insertion hole and an elastic body elastically supporting the connection part.

The fixing member may be screw-connected to the front end of the case to be movably disposed in the front and back direction upon a rotation.

A back end of the carrier may be rotatably provided with a fixed bar while being spaced apart from the adaptor cover, the fixed bar may be provided with a clamp mechanism, and a first side end of the clamp mechanism may be connected to the fixed bar and a second side end thereof may be connected to the luggage.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3, FIG. 4, FIG. 5, FIG. 6, FIG. 7, FIG. 8, FIG. 9, and FIG. 10 are diagrams illustrating the carrier apparatus for a vehicle illustrated in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
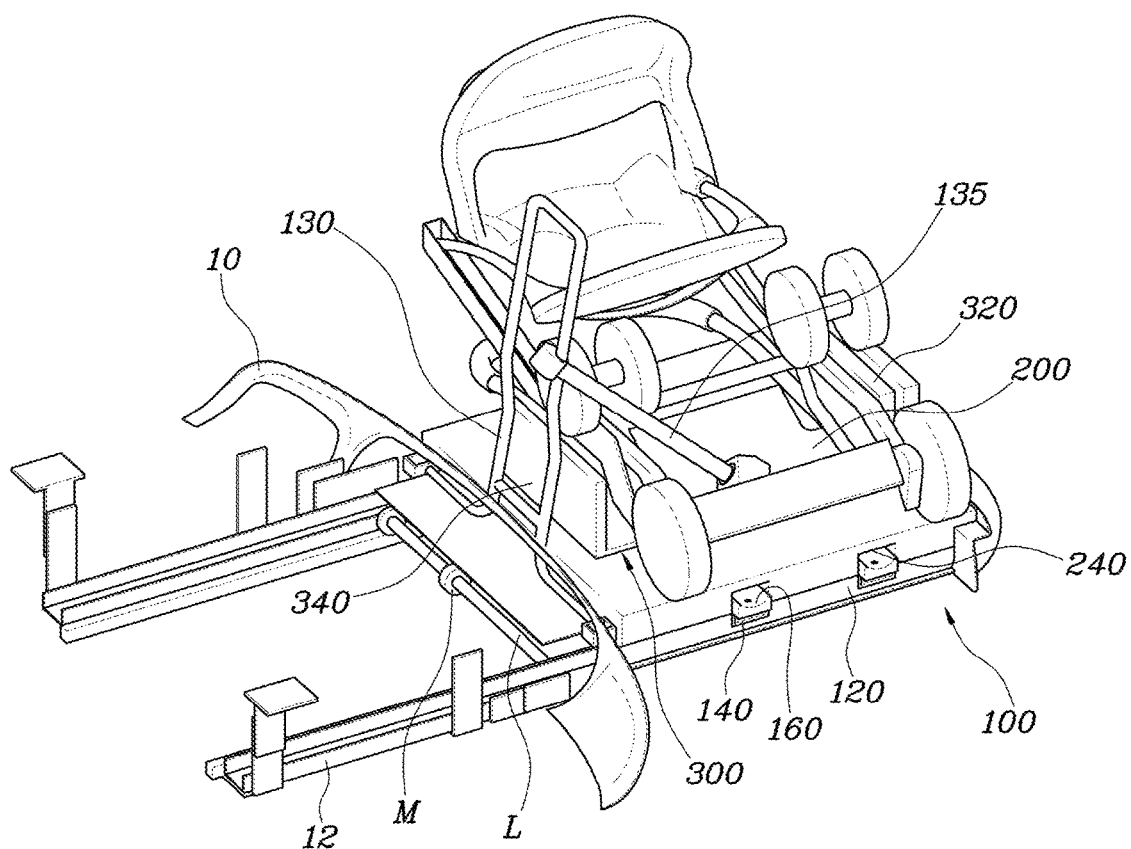
FIG. 1 and FIG. 2 are diagrams illustrating a carrier apparatus for a vehicle according to various embodiments of the present invention.
Figure 2:
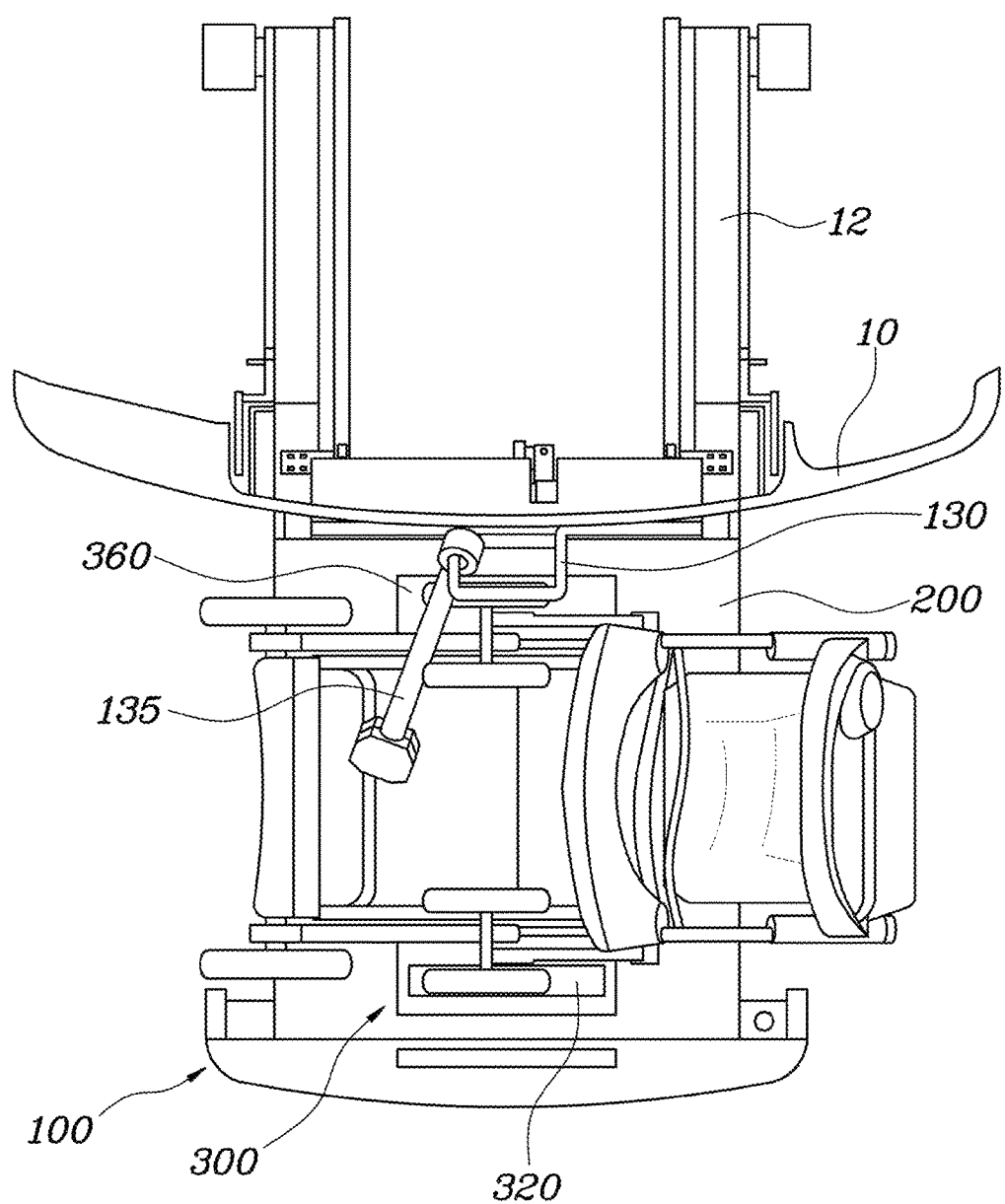

FIG. 1 and FIG. 2 are diagrams illustrating a carrier apparatus for a vehicle according to various embodiments of the present invention and FIGS. 3 to 10 are diagrams for describing the carrier apparatus for a vehicle illustrated in FIG. 1.

In FIGS. 1, 4, and 6 to 10 among the accompanying drawings, it is to be understood that various embodiments of the present invention will be described below, setting a left direction as a back direction of a carrier and a right direction as a front direction of the carrier.

As illustrated in FIGS. 1 and 2, a carrier apparatus for a vehicle according to various embodiments of the present invention includes a carrier 100 provided to slidably move in a front and back direction at a lower portion of a bumper back beam 10 to be drawn out or received, an adapter cover 200 rotatably installed at an upper portion of the carrier 100 in an up and down direction and having an upper portion depressed to be formed with an installation space 220, and a loading cover 300 detachably connected to the installation space 220 of the adapter cover 200 and provided with a fixture 320 for fixing a luggage loaded at an upper portion thereof.

According to various embodiments of the present invention, the carrier 100 is disposed in a bumper back beam 10 of a back portion of a vehicle to be maintained in a state in which it is not exposed at ordinary times or is drawn out from the bumper back beam 10 at the time of a loading of a bicycle or the luggage, thereby loading the bicycle or the luggage. In particular, the upper portion of the carrier 100 is provided with the adapter cover 200 and the adapter cover 200 is rotated at the upper portion of the carrier 100 to improve loading ease of the luggage.

The upper portion of the adapter cover 200 is provided with the loading cover 300 for fixing the loaded luggage. The loading cover 300 is detachably connected to the adapter cover 200 and is provided with the fixture 320 for fixing the loaded luggage.

As a result, various embodiments of the present invention may provide for loading a bicycle by the carrier 100 and loading various sizes of the luggage such as a baby carriage and a large box by the adapter cover 200 and the loading cover 300. In particular, the adapter cover 200 is rotated in the state in which the carrier 100 is drawn out to easily load the luggage and the fixture 320 of the loading cover 300 fixes the luggage, such that the luggage may be stably fixed to and seated in the carrier 100.

Describing various embodiments of the present invention in detail, the bumper back beam 10 is provided with guide rails 12 extended in a front and back direction and both ends of the carrier 100 are provided with slide rails 120 connected to the guide rails 12 and slided on the guide rails 12.

That is, as illustrated in FIG. 1, the carrier 100 may move along the guide rail 12 fixedly installed at the bumper back beam 10 through the sliding rail. Here, the carrier 100 is provided with a separate driving motor M connected to the guide rails 12, in which the driving motor M rolling-contacts the guide rails 12 through a driving link L and when the driving motor M is operated, the carrier 100 may move along the guide rails 12. To this end, the driving link L connected to the driving motor M is applied with a pinion structure and the guide rails 12 is applied with a rack structure, such that the driving motor M and the guide rail 12 may be connected in the rack and pinion structure and the operation of the driving motor M may be controlled by a remote control of a user.

Meanwhile, as illustrated in FIG. 3, the carrier 100 may be provided with an extension rail 140 extended to cross the sliding rail 120 and an extension support 160 slidably moving in both side directions along the extension rail 140.

Here, the extension support 160 is a location at which wheels of a bicycle are seated and may be formed in pair to be symmetrical to each other in a side direction. The pair of extension supports 160 is configured to be extendedly unfolded in an opposite direction to each other and thus is configured to be away from each other when being extendedly unfolded to thereby be controlled to meet a size of a bicycle.

That is, the carrier 100 is provided with the extension rail 140 crossing laterally. The extension support 160 is connected to the extension rail 140 to be slid along the extension rail 140, and thus may be located to meet a size of a bicycle.

Meanwhile, as illustrated in FIG. 4, the adapter cover 200 may be formed of a flat plate having a predetermined area to cover the upper portion of the carrier 100 and may be provided with a sliding hole 240 in both side directions to expose the extension support 160 of the carrier 100 through the sliding hole 240.

By doing so, the adapter cover 200 may be formed in the flat plate, such that the loaded luggage may be stably seated. In particular, the adapter cover 200 is provided with the sliding hole 240 in both side directions to expose the extension support 160 of the carrier 100 through the sliding hole 240, such that a bicycle may be loaded at the upper portion of the carrier 100. Therefore, the adapter cover 200 does not interfere with the extension support 160 while being loaded with the luggage, such that a bicycle may be smoothly loaded.

Meanwhile, as illustrated in FIG. 4, both side ends of a back end of the carrier 100 is provided with locking pins 180 and a back end of the adapter cover 200 may be provided with a fastening part 260 that is fastened or unfastened with the locking pin 180 and a front end thereof may be rotatably hinge-connected to the carrier 100.

That is, according to various embodiments of the present invention, the adapter cover 200 is rotatably installed at the carrier 100, such that the luggage may be easily loaded. Therefore, the front end of the adapter cover 200 is hinged-connected to the carrier 100, and thus the adapter cover 200 may be rotated in the carrier 100 in an up and down direction based on a hinge-connected point as a rotating central point.

However, the folded location of the adapter cover 200 needs to be fixed when the adapter cover 200 is not rotated. In this case, the back end of the adapter cover 200 is provided with the fastening part 260 and the back end of the carrier 100 is provided with the locking pin 180, such that the rotation of the adapter cover 200 is limited when the fastening part 260 is fastened with the locking pin 180.

Figure 5:
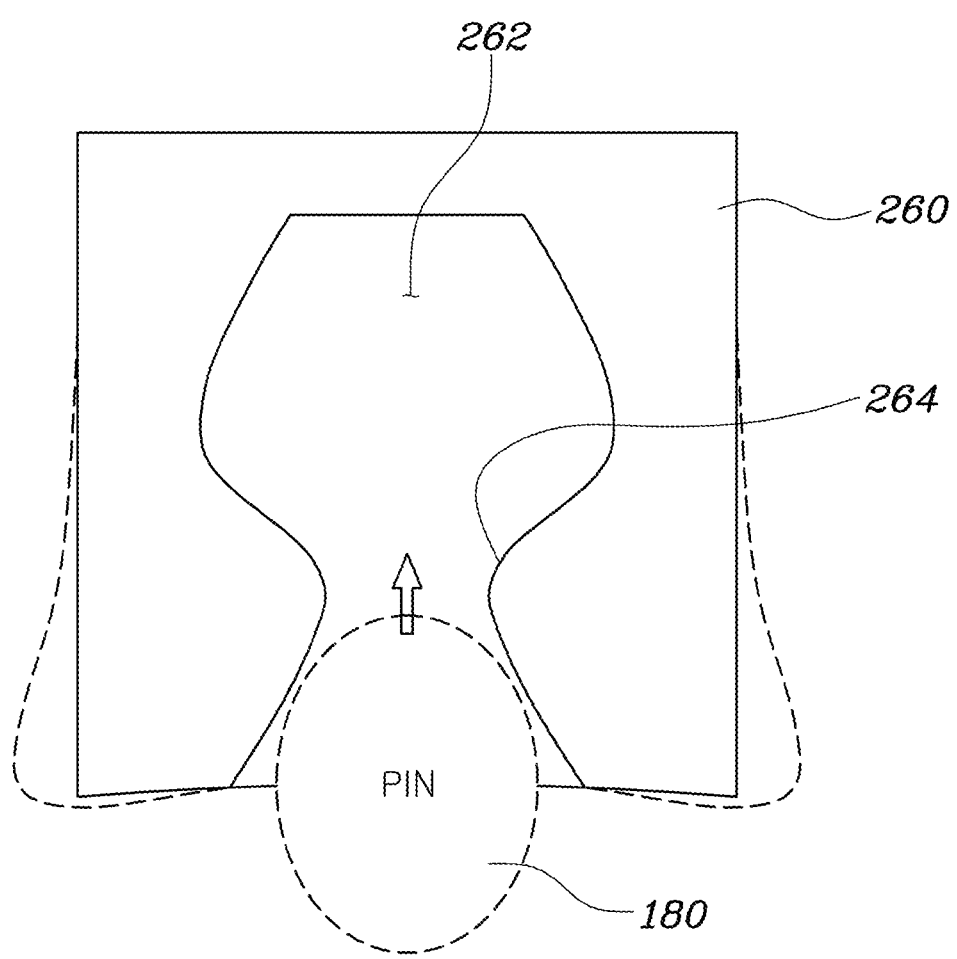

That is, as illustrated in FIG. 5, the fastening part 260 is extended downward from both side ends of the adapter cover 200 and is provided with a through hole 262 into which the locking pin 180 is inserted and the through hole 262 may be provided with a fixed protrusion 264. The fastening part 260 is made of a flexible material and may elastically be deformed. Therefore, when the adapter cover 200 is folded at the upper portion of the carrier 100, the fastening part 260 moves downward from an upper portion of the locking pin 180 and the locking pin 180 penetrates through the fixed protrusion 264 of the through hole 262 and then is fastened with the fixed protrusion 264, such that the adapter cover 200 may be fixed to the carrier 100. Here, when the locking pin 180 penetrates through the fixed protrusion 264, as the fastening part 260 is made of a flexible material, the through hole 262 is deformed to be spread and when the locking pin 180 completely penetrates through the fixed protrusion 264, the fastening part 260 is recovered to an original state and thus the locking pin 180 is fixed by the fixed protrusion 264 within the through hole 262. Therefore, the fastening part 260 of the adapter cover 200 is fastened with the locking pin 180 of the carrier 100 and thus the rotation of the adapter cover 200 is limited and if the adaptor cover 200 is applied with a force to forcibly rotate again, the locking pin 180 is separated from the through hole 262 of the fastening part 260 and thus is unfastened from the fastening part 260, such that the rotation of the adapter cover 200 may be permitted.

Figure 6:
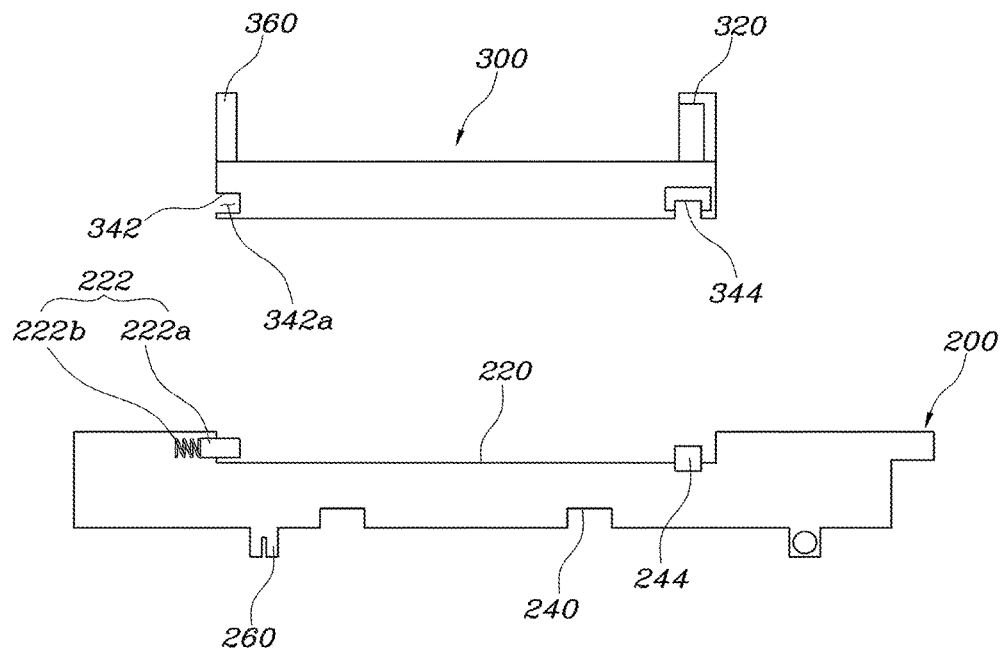
Figure 7:
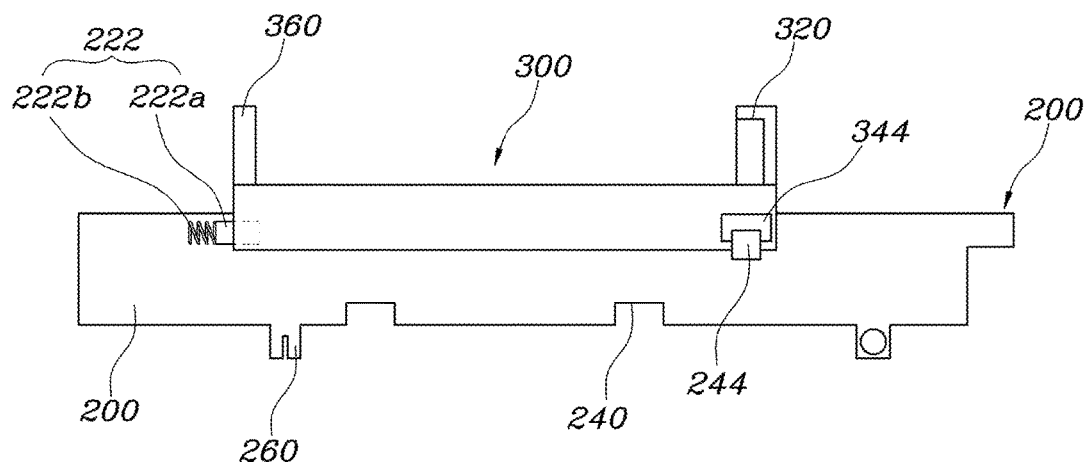

Meanwhile, as illustrated in FIGS. 6 and 7, one side of the installation space 220 of the adapter cover 200 is provided with a first fixing part 222 and the other side thereof is provided with a second fixing part 244 and the loading cover 300 may be provided with a first connection part 342 with which the first fixing part 222 is fastened and a second connection part 344 with which the second fixing part 244 is fastened, when it is connected to the installation space 220.

That is, the loading cover 300 is separably connected to the adapter cover 200 and thus is separated from the adapter cover 200 when the loading cover 300 is not used, such that the carrier 100 slidably moves in the bumper back beam 10 to be drawn out or received and the loading cover 300 is assembled at the upper portion of the adapter cover 200 in the state in which the carrier 100 is drawn out when the loading cover 300 is used, such that various kinds of the luggage may be loaded.

Therefore, the loading cover 300 is provided with the first connection part 342 and the second connection part 344, the adapter cover 200 is provided with the first fixing part 222 and the second fixing part 244 corresponding thereto, and thus the first connection part 342 and the first fixing part 222 and the second connection part 344 and the second fixing part 244 are fastened with each other, such that the loading cover 300 may be fixed to the adapter cover 200.

In detail, the first fixing part 222 may be formed of a piston 222a that protrudes while being elastically supported at one side of the installation space 220 and the first connection part 342 may be formed of an insertion groove 342a depressed to have the piston 222a inserted thereinto. That is, the first fixing part 222 that is provided at the installation space 220 of the adapter cover 200 is configured to include the piston 222a elastically supported by a return spring 222b and one side of the loading cover 300 is provided with the insertion groove 342a that is the first connection part 342 into which the piston 222a is inserted to thereby insert the piston 222a that is the first fixing part 222 into the insertion groove 342a that is the first connection part 342 when the loading cover 300 is assembled in the installation space 220, such that one side of the loading cover 300 is fixed to one side of the installation space 220 of the adapter cover 200.

Preferably, a lower end of one side of the loading cover 300 is diagonally inclined and thus the piston 222a is smoothly pushed to the inclined surface of the loading cover 300 when it is assembled downward from the upper portion of the installation space 220, thereby compressing the return spring 222b.

Meanwhile, the second fixing part 244 may be formed of a magnetic body installed at the other side of the installation space 220 and the second connection part 344 is installed at the other side of the loading cover 300 to correspond to the magnetic body and may be formed of a corresponding body connected reacting to the magnetic body. That is, the second fixing part 244 provided at the installation space 220 of the adapter cover 200 is formed of the magnetic body and the corresponding body is formed of the reaction body at the other side of the loading cover 300, in which the reaction body reacts to the magnetic body and is connected to the other side of the loading cover 300, such that the magnetic body that is the second fixing part 244 and the corresponding body that is the second connection part 344 are connected to each other by a magnetic force when the loading cover 300 is assembled in the installation space 220, such that the other side of the loading cover 300 is fixed to the other side of the installation space of the adapter cover 200.

Here, the corresponding body that is the second connection part 344 may be another magnetic body having polarity different from the magnetic body that is the second fixing part 244 and is made of a steel material to be connected to the magnetic body while reacting to the magnetic body.

By doing so, one side and the other side of the loading cover 300 may be fixed when being assembled in the installation space 220 of the adapter cover 200 and the first fixing part 222 and the first connection part 342 are first connected when the loading cover 300 is assembled in the installation space 220 and then the second fixing part 244 and the second connection part 344 are connected, such that the loading cover 300 may be fixed to the installation space 220. Further, when the loading cover 300 is separated from the installation space 220, the second fixing part 244 that is the magnetic body is applied with a force to be separated from the second connection part 344 and then the first fixing part 222 formed of the piston 222a is separated from the first connection part 342, such that the loading cover 300 may be separated from the installation space 220.

As illustrated in FIG. 4, a front end of the loading cover 300 is provided with a fixture 320 and a back end thereof is provided with a fixed end 360 upwardly extended, and thus the fixture 320 pushes the luggage toward the fixed end 360 when the luggage is loaded between the fixture 320 and the fixed end 360, such that the luggage may be fixed. As such, when the luggage is loaded between the fixture 320 provided at the front end of the loading cover 300 and the fixed end 360 provided at the back end thereof, the fixture 320 fixes the luggage, thereby preventing the luggage from being separated from the loading cover 300.

Figure 8:
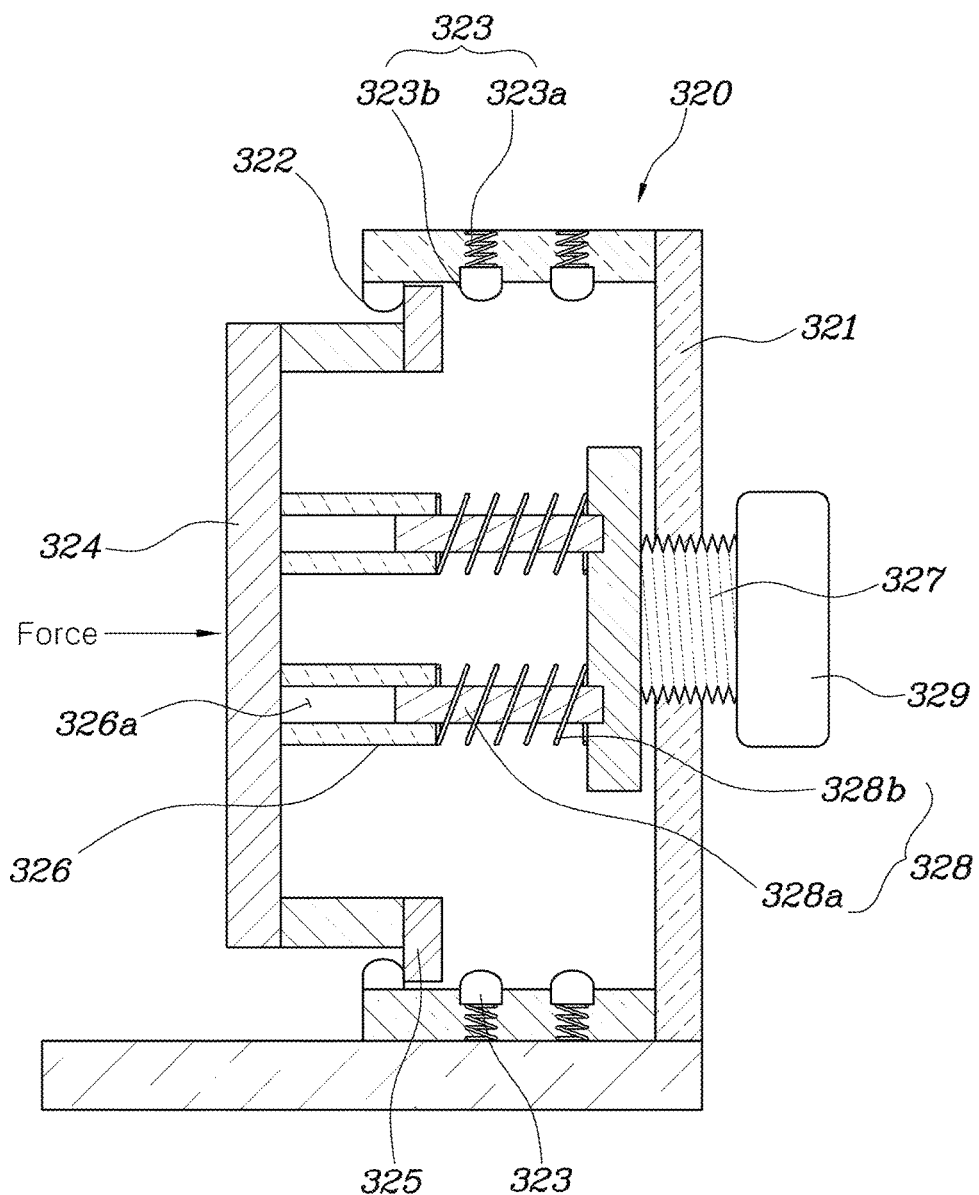
Figure 9:
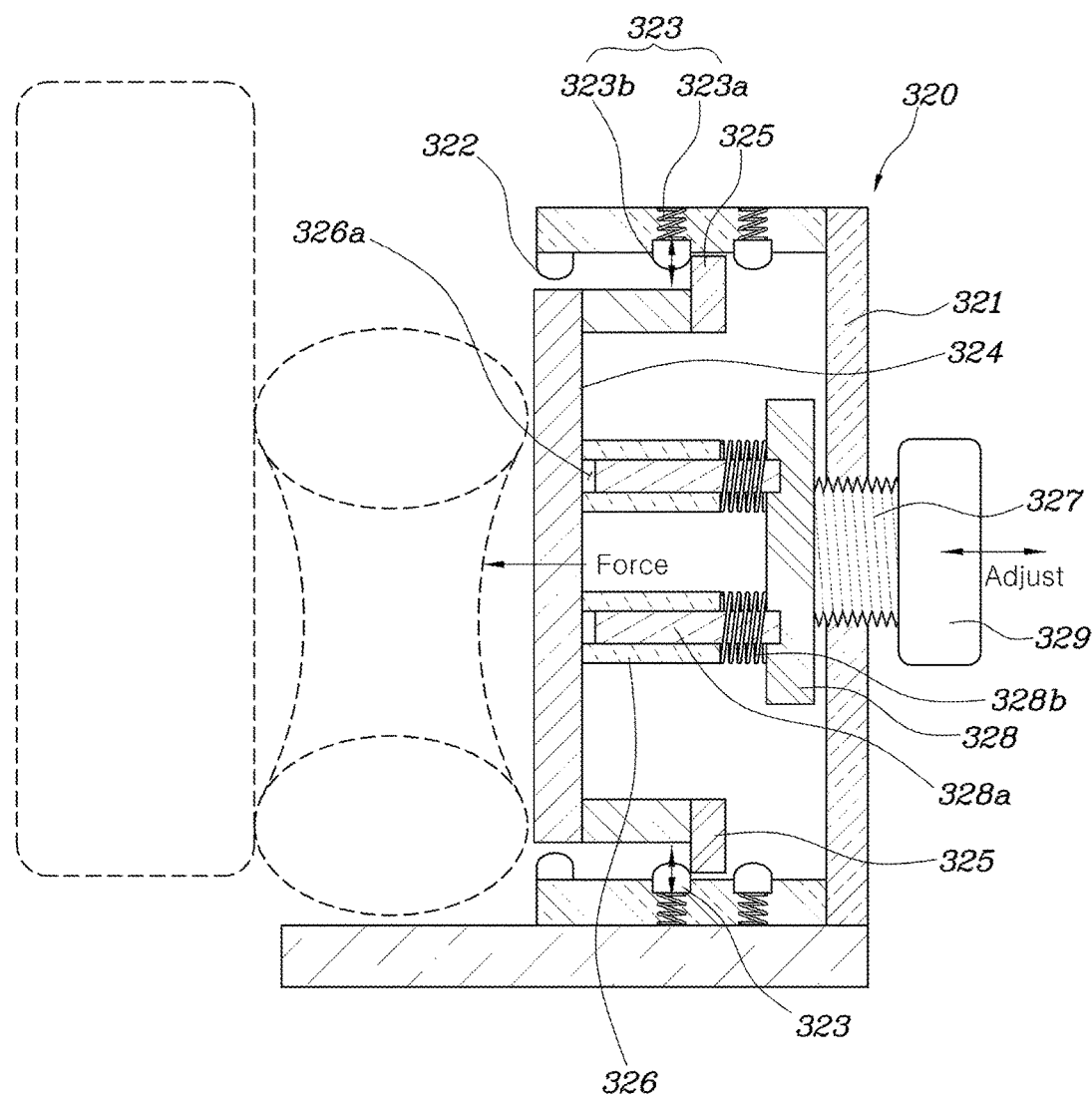

As illustrated in FIGS. 8 and 9, the fixture 320 may include a case 321 opened toward the back portion, a moving member 324 provided to move in a front and back direction in the case 321, and a fixing member 327 installed at the front end of the case 321 to elastically support the moving member 324 and moving in a front and back direction in the case 321 and then fixed. Here, the case 321 is fixedly installed at the front end of the loading cover 300 and the moving member 324 moving in the case 321 may move toward the fixed end 360 in a front and back direction. The moving member 324 is elastically supported by the fixing member 327 to elastically support the loaded luggage and the fixing member 327 may be provided to move in a front and back direction to change a position of the moving member 324.

In detail, as illustrated in FIG. 8, the case 321 is formed in a box form having an opened back portion and provided with locking protrusions 322 protruding inwardly at upper and lower ends thereof and protrusions 325 protrude at upper and lower ends of the moving member 324 to be locked to the locking protrusions 322 when the moving member 324 moves in the case 321, such that the movement of the moving member 324 may be limited. The back portion of the case 321 is opened, and thus the moving member 324 may move to the opened space. Here, the locking protrusions 322 protrude inwardly at the upper and lower ends of the back portion of the case 321 and the protrusions 325 protrude at the upper and lower ends of the front portion of the moving member 324, and thus when the moving member 324 excessively moves within the case 321, the protrusion 325 of the moving member 324 is locked to the locking protrusion 322 of the case 321, such that the movement of the moving member 324 may be limited. As a result, the moving member 324 moves in the case 321 but the movement of the moving member 324 is limited when the moving member 324 excessively moves, such that the separation is not made.

Meanwhile, the upper and lower ends of the case 321 are each provided with position fixing parts 323 elastically supported inwardly to inwardly protrude and having the protrusions 325 of the moving member 324 locked thereto, and the position fixing parts 323 may be provided in plural while being spaced apart from each other at a predetermined distance. By doing so, the position fixing parts 322 formed at the upper and lower ends of the case 321 may be formed of a head part 323b elastically supported by an elastic spring 323a and as the head part 323b is exposed while being elastically supported, the protrusion 325 of the moving member 324 may be locked to the position fixing part 323. As a result, the moving member 324 moves while being elastically supported by the fixing member 327 and when the protrusion 325 is locked to the head part 323b of the position fixing part 323, the position thereof is fixed at the corresponding position. However, when the moving member 324 is applied with an additional external force, the head part 323b of the position fixing part 323 overcomes an elastic force of the elastic spring 323a to be retreated, and thus the moving member 324 may move.

As a result, the moving member 324 moves to meet the size of the luggage when the luggage is loaded in the loading cover 300 and then is locked to the position fixing part 323 to be fixed, such that position of the luggage may be stably fixed.

Meanwhile, the front end of the moving member 324 may be extended forwardly and may be provided with a connection part 326 formed with the insertion hole 326a, the back end of the fixing member 327 may be provided with a contact part 328 contacting the connection part 326, and the contact part 328 may be provided with a rod 328a inserted into the insertion hole 326a and an elastic body 328b elastically supporting the connection part 326.

As such, as the rod 328a formed at the contact part 328 of the fixing member 327 is inserted into the insertion hole 326a formed at the connection part 326, the moving member 324 may stably slidably move along a direction in which the rod 328a of the contact part 328 is extended, and in particular, the connection part 326 may be elastically supported by the elastic body 328b to stably support the loaded luggage and the position of the moving member 324 may return when the luggage is separated.

Here, the fixing member 327 is screw-connected to the front end of the case 321 and may be thus movably installed in a front and back direction upon the rotation. As such, the fixing member 327 moves in a front and back direction upon the rotation while being screw-connected in the case 321, and thus the moving member 324 is applied with the additional external force when the fixing member 327 moves backwardly, such that the moving member 324 may be separated in the state in which it is locked to the position fixing part 323 and the position of the moving member 324 may be controlled to meet the size of the luggage in the state in which the luggage is loaded. Here, the front end of the fixing member 327 may be provided with a handle 329 for screw rotation.

Meanwhile, as illustrated in FIG. 1, the back end of the carrier 100 is rotatably provided with a fixed bar 130 while being spaced apart from the adaptor cover 200, the fixed bar 130 is provided with a clamp mechanism 135, and one side end of the clamp mechanism 135 may be connected to the fixed bar 130 and the other side end thereof may be connected to the luggage. As such, the carrier 100 is provided with the fixed bar 130 and the loaded luggage is connected to the fixed bar 130 through the clamp mechanism 135, thereby maintaining the state in which the luggage is more stably seated. As the clamp mechanism 135, various kinds of known clamp mechanisms 135 for fixing a bicycle may be applied.

The carrier apparatus for a vehicle as described above may load a bicycle through the extension support 160 if the carrier 100 is drawn out from the bumper back beam 10.

In particular, the upper portion of the carrier 100 may be provided with the adapter cover 200 and the adapter cover 200 may be provided with the loading cover 300 and loaded with different size of the luggage as well as a bicycle by the fixture 320 provided at the loading cover 300.

That is, when the luggage is loaded between the fixed end 360 of the loading cover 300 and the fixture 320, the moving member 324 of the fixture 320 moves while compressing the elastic body 328b provided at the contact part 328 of the fixing member 327 and the position of the moving member 324 is fixed by the position fixing part 323 provided at the case 321 in the state in which the moving member 324 meets the size of the luggage and thus the position thereof is fixed in the state in which the loaded luggage is applied with a force. As such, the moving member 324 of which the position is fixed may be recovered to an original position when being applied with the additional external force by the fixing member 327 and as the fixing member 327 moves, the moving member 324 and the luggage may be more firmly fixed.

Figure 10:
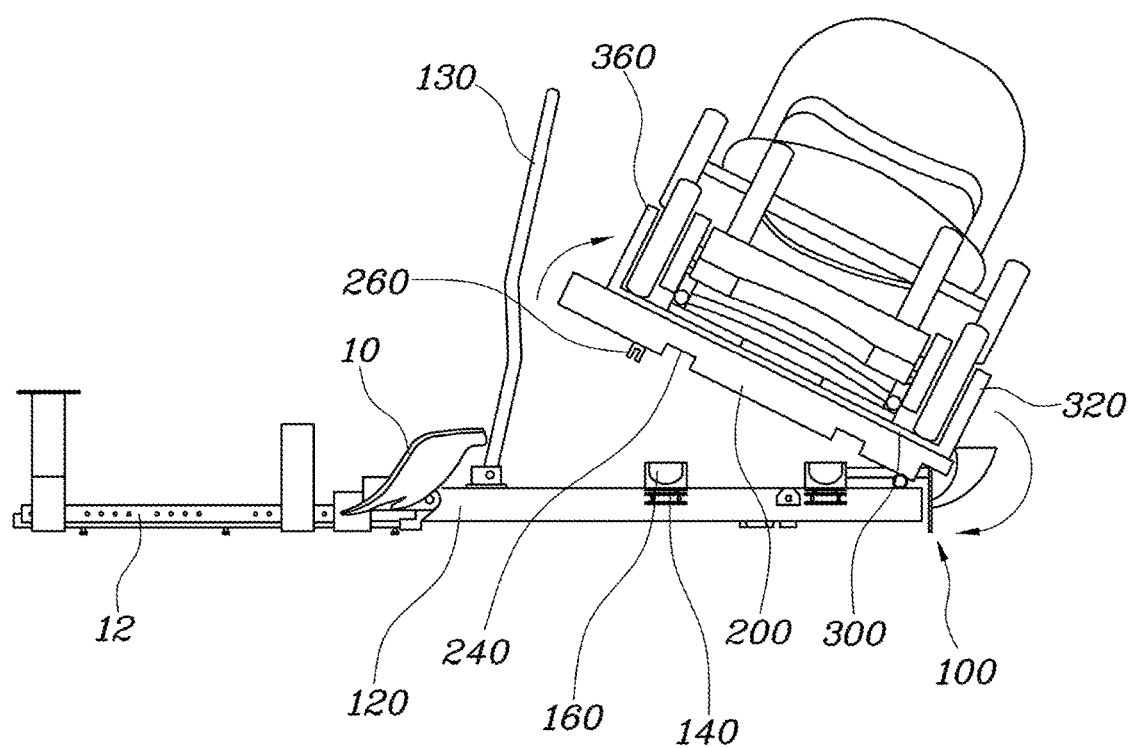

Meanwhile, to facilitate loading of the luggage in the loading cover 300, the adapter cover 200 of FIG. 10 is rotated, and thus the position of the loading cover 300 may move and the rotated position of the adapter cover 200 may be fixed by a separate link.

Further, the carrier 100 is also rotatably configured in the bumper back beam 10, thereby more easily loading the luggage.

According to the carrier apparatus for a vehicle having the above-mentioned structure, the bicycle carrier 100 may be installed at the bumper back beam 10 of the back portion of the vehicle to prevent the bicycle carrier from being exposed to the outside at ordinary times and draw out the bicycle carrier from the bumper back beam 10 at the time of the loading of the bicycle to thereby enable the loading of the bicycle and the luggage, thereby maintaining the appearance design and improving the convenience at ordinary times.

In particular, the luggage may be firmly and stably fixed at the time of a loading of various sizes of the luggage as well as a bicycle and the loaded luggage may be conveniently fixed, thereby more improving the use convenience.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A carrier apparatus for a vehicle, comprising:
   a carrier slidably disposed in a front and back direction at a lower portion of a bumper back beam to be drawn out and received in the bumper back beam;
   an adapter cover rotatably disposed at an upper portion of the carrier in an up and down direction and having an upper portion depressed to form an installation space; and
   a loading cover detachably connected to the installation space of the adapter cover and provided with a fixture for fixing a luggage loaded at an upper portion thereof,
   wherein a front end of the loading cover is provided with the fixture and a back end thereof is provided with a fixed end upwardly extended, and thus the fixture pushes the luggage toward the fixed end when the luggage is loaded between the fixture and the fixed end, to thereby fix the luggage.

2. The carrier apparatus for the vehicle of claim 1, wherein the bumper back beam is provided with guide rails extended in the front and back direction, and
   side ends of the carrier are provided with slide rails connected to the guide rails and slided on the guide rails.

3. The carrier apparatus for the vehicle of claim 2, wherein the carrier is provided with an extension rail extending to cross the sliding rail and an extension support slidably moving in both side directions along the extension rail.

4. The carrier apparatus for the vehicle of claim 3, wherein the adapter cover is formed in a flat plate having a predetermined area to cover the upper portion of the carrier and is provided with a sliding hole in both of the side directions to expose the extension support of the carrier through the sliding hole.

5. The carrier apparatus for the vehicle of claim 1, wherein both side ends of a back end of the carrier are provided with locking pins, and
   a back end of the adapter cover is provided with a fastening part that is fastened to and unfastened from the locking pin and a front end thereof is rotatably hinge-connected to the carrier.

6. The carrier apparatus for the vehicle of claim 5, wherein the fastening part is extended downward from both side ends of the adapter cover and is provided with a through hole into which the locking pin is inserted and the through hole is provided with a fixed protrusion.

7. The carrier apparatus for the vehicle of claim 1, wherein a first side of the installation space of the adapter cover is provided with a first fixing part and a second side thereof is provided with a second fixing part, and the loading cover is provided with a first connection part with which the first fixing part is fastened and a second connection part with which the second fixing part is fastened, when the loading cover is connected to the installation space.

8. The carrier apparatus for the vehicle of claim 7, wherein the first fixing part is formed of a piston that protrudes while being elastically supported at the first side of the installation space and the first connection part is formed of an insertion groove depressed to have the piston inserted thereinto.

9. The carrier apparatus for the vehicle of claim 7, wherein the second fixing part is formed of a magnetic body disposed at the second side of the installation space, and the second connection part is disposed at a side of the loading cover to correspond to the magnetic body and formed of a corresponding body connected reacting to the magnetic body.

10. The carrier apparatus for the vehicle of claim 1, wherein the fixture includes:

a case opened toward a back portion;

a moving member provided to move in a front and back direction in the case; and a fixing member disposed at a front end of the case to elastically support the moving member and moving in the front and back direction in the case and then fixed.

11. The carrier apparatus for the vehicle of claim 10, wherein the case is formed in a box shape having an opened back portion and provided with locking protrusions protruding inwardly at upper and lower ends thereof, and protrusions protrude at upper and lower ends of the moving member to be locked to the locking protrusions when the moving member moves in the case to limit the movement of the moving member.

12. The carrier apparatus for the vehicle of claim 10, wherein the upper and lower ends of the case are each provided with position fixing parts that are elastically supported inwardly to inwardly protrude and have the protrusions of the moving member locked thereto, and the position fixing parts are provided in plural while being spaced apart from each other at a predetermined distance.

13. The carrier apparatus for the vehicle of claim 10, wherein a front end of the moving member is provided with a connection part that is extended forwardly and formed with an insertion hole, and a back end of the fixing member is provided with a contact part contacting the connection part and the contact part is provided with a rod inserted into the insertion hole and an elastic body elastically supporting the connection part.

14. The carrier apparatus for a vehicle of claim 10, wherein the fixing member is screw-connected to the front end of the case to be movably disposed in the front and back direction upon a rotation.

15. The carrier apparatus for a vehicle of claim 1, wherein a back end of the carrier is rotatably provided with a fixed bar while being spaced apart from the adaptor cover, the fixed bar is provided with a clamp mechanism, and a first side end of the clamp mechanism is connected to the fixed bar and a second side end thereof is connected to the luggage.

* * * * *